Figure 1:
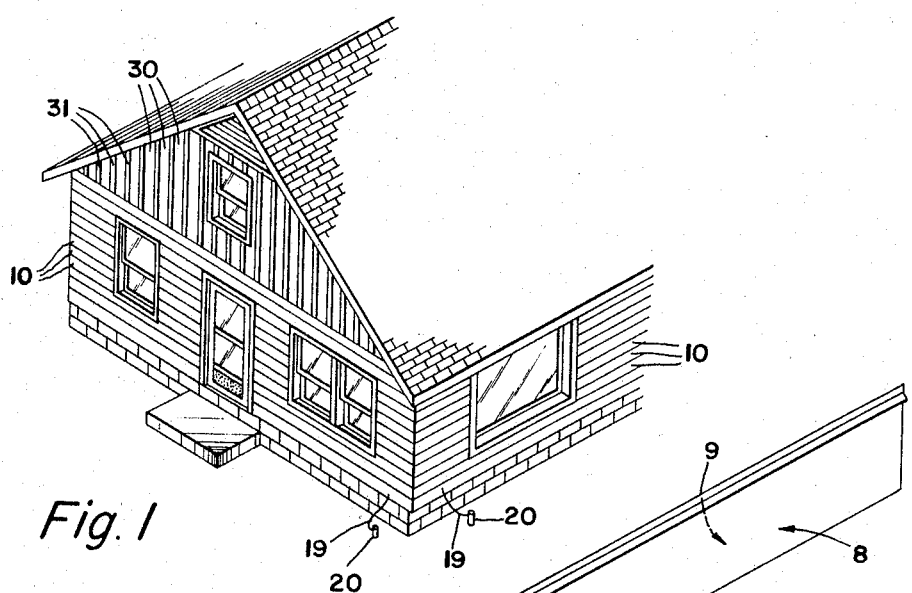

May 9, 1967     M. R. COLLINS     3,318,060

DIELECTRIC COATED ALUMINUM PANEL SIDING

Original Filed March 13, 1962

INVENTOR.
MARVIN R. COLLINS
BY
ATTORNEYS

# United States Patent Office 3,318,060
Patented May 9, 1967

3,318,060
DIELECTRIC COATED ALUMINUM
PANEL SIDING
Marvin R. Collins, Akron, Ohio, assignor to Alsco, Inc., Akron, Ohio, a corporation of Delaware
Continuation of application Ser. No. 179,370, Mar. 13, 1962. This application Dec. 8, 1965, Ser. No. 517,178
8 Claims. (Cl. 52—173)

This is a continuation of my copending application, Ser. No. 179,370, filed Mar. 13, 1962, now abandoned. This invention relates to aluminum siding panels and to wall facings comprising arrays of siding panels. Such wall facings are usually referred to as aluminum panel siding.

Prefinished aluminum panel siding is generally provided with corrosion-resistant protective coatings on both sides. These have a dielectric property, and to obtain good electrical grounding of the wall it is necessary to provide an electrically conductive external rod or cable which is welded or otherwise electrically connected to the panels and to a suitable ground connection. Such an installation is unsightly, particularly where provided on all four sides of a building. It may also be costly, particularly where its installation requires labor by a different trade or craft than that which is employed to erect the wall. However, such an installation is required when grounding of the aluminum panel siding is necessary or desirable, such as where in the absence of grounding a lightning fire hazard exists, or where it is desired to exploit the conductance of the aluminum as an electrical shield against lightning.

If the dielectric anti-corrosion coatings are omitted from the joints or junctures between panels, electrical continuity of the wall may be achieved without an unsightly cable. However, these joints are more susceptible to corrosion damage than other parts of the wall. Acids and alkalis deposited from moist air or contained in soil or other foreign matter splashed on the wall by passersby tend to be more chemically active where moisture lingers, where shelter against rainwater is provided, and where the possibility of galvanic action is maximized. All these conditions occur at the joints between panels, particularly on the underside of horizontal joints in aluminum panel siding which imitates horizontal board siding.

Since the joints between panels are the most corrosion-prone portions of the wall area, elimination of the corrosion-resistant coating at these joints has not been considered feasible, and the costly installation of unsightly cables and the like has been necessary to achieve good grounding.

The present invention involves the concept of providing electrical contact between adjacent panels along a line of electrical contact which is contained interiorly of the panel joint so that all exteriorly exposed panel portions are covered by the dielectric corrosion-resistant coating. In one important aspect, the line of electrical contact is shielded against corrosive agents, and any corrosion that may occur is contained by lines of dielectric contact space to each side of the line of electrical contact.

In a more particular aspect, the invention contemplates the provision of lines of dielectric contact between adjacent panels on each side of a line of electric contact but below the line of electric contact so that the line of electric contact is the highest of the several contacting portions of the adjacent panels.

Figure 2:
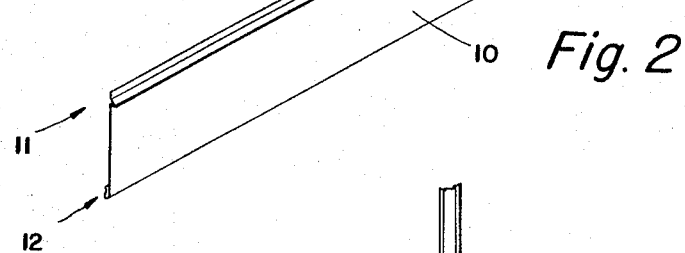
Figure 3:
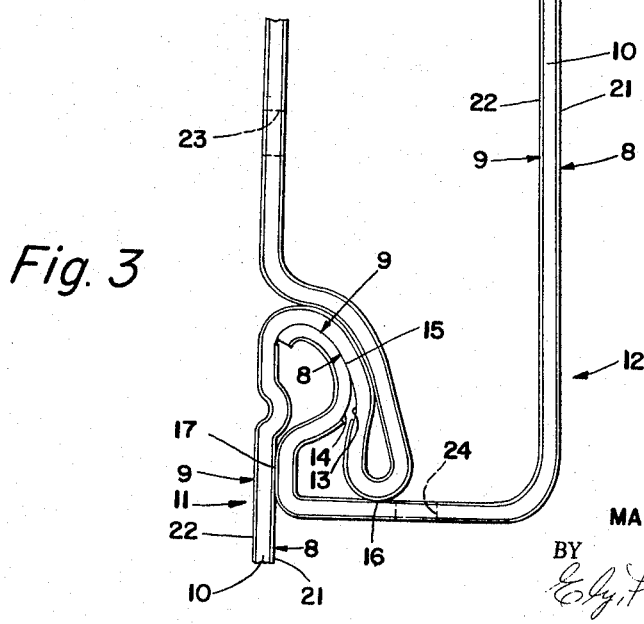

The drawings show one example of the invention as embodied in a particular aluminum panel siding installation. FIGURE 1 illustrates a building having an exterior finish of aluminum panel siding. FIGURE 2 is an enlarged view of one of the horizontal panels of the siding of FIGURE 1. FIGURE 3 is an idealized fragmentary end view on a still larger scale of two of the panels of the type illustrated in FIGURE 2 and showing the joint formed between the two panels.

Shown in FIGURE 1 is a structure including walls having exterior sides which comprise aluminum panel sides. The walls may comprise a number of aluminum siding panels 10 oriented in the horizontal direction to comprise a horizontal board effect. There may be panels 30 oriented in a vertical direction to give a vertical board effect as seen at the highest portion of the wall structure. The "upper" and "lower" (side edge) joints or junctures or interlocks of the vertical panels 30 may be identical with those of the horizontal panels to be described below, and are therefore not described in detail. If desired, the vertical panels may have protrusions formed adjacent one edge by extra folds to provide imitation batten strips 31. Otherwise, however, the vertical panels may be identical with the horizontal panels, including identity of interlock structure as just mentioned.

One of the panels 10 is shown in somewhat enlarged view in FIGURE 2. The principal area of the panel is bounded at the top by an upper edge portion or joint portion generally indicated by the reference numeral 11 and a lower edge portion or joint portion generally indicated by the reference numeral 12. Each panel 10 has a front face 8 and a rear face 9. During manufacture, and before they are installed in a wall array, the panels 10 are provided with dielectric corrosion-resistant protective coatings which may or may not be the same on the front and back faces of the panels. The dielectric corrosion-resistant protective coatings on the exterior side may comprise a paint or finish which is particularly adapted to exterior exposure and exterior dress of the wall, while the interior coating or paint may be particularly adapted for the interior wall conditions and need not fulfill any decorative or aesthetic function.

It will be understood however that in some circumstances it may be desirable to employ the same dielectric corrosion-resistant coating on both sides of the panel. However in the illustrated structure the exterior dielectric corrosion-resistant protective coating is indicated by a reference numeral 21, and a different dielectric corrosion-resistant protective coating is indicated for the interior side of the panel by the use of a different reference numeral 22. Because of the scale of the drawings, the coatings 21 and 22 are not indicated in FIGURES 1 and 2, and they are indicated on an exaggerated scale even in the greatly enlarged scale of FIGURE 3.

Well known chemical primer coatings which are fairly good conductors may underlie the coatings 21 and 22. Due to their conductance, such coatings are generally immaterial to the present invention and are not shown in the drawings for the sake of clarity. However, it may be mentioned that such primer coatings extend over all the metal and may have some value in helping to inhibit corrosion.

In the vicinity of the lower edge 12 of each panel 10 a portion 14 of the rear face 9 is free of the dielectric protective coating 22 and is in interfacial contact with a portion 13 of the front face 8 of the lower panel of the pair in the vicinity of the upper edge 11 of the lower panel. The portion 13 of the front face 8 of the lower panel is free of the dielectric protective coating 21 and there is thereby established a line of interfacial electrical contact 15 between the adjacent panels 10.

The remainder of the front and back faces 8 and 9 of the panels 10 are covered by the dielectric protective coatings 21 and 22, with the panels interfacially contacting each other at lines of dielectric contact 16 and 17. Nailing slots may be provided at 23 and drain slots at 24 as shown.

It will be noted that the lines of dielectric contact 16 and 17 are located at either side of the line of electrical contact 15. Each of the lines of dielectric contact 16 and 17 is spaced from the line of electrical contact 15 both in the sense that the lines of contact 16 and 17 are laterally displaced along the facing surfaces 8 and 9 of the two panels from the line 15 and in the sense that between the line of contact 15 and each of the lines of contact 16 and 17 the interfacial contact between the two panels is interrupted. In the illustrated wall structure, the line of electrical contact 15 is also located above the lines of dielectric contact 16 and 17.

The line of contact 15 is substantially completely sheltered against the deposit of any corrosive materials, and is so located that any corrosion as may occur at this point will have little or no effect on the appearance or performance of the aluminum panel siding.

With the particular configuration illustrated in FIGURE 3 which is presently preferred, it will be noted that the rear face 9 of the uppermost panel 10 at the line of electrical contact 15 is forwardly upwardly oriented, while the front face 8 of the lower panel 10 at the line of electrical contact 15 is downwardly rearwardly oriented. The result is that the products of any corrosion that may form at the line of electrical contact 15 will tend to fall within the pocket formed between the contact lines 15 and 16, rather than into the pocket formed between the lines 15 and 17, thus avoiding possible streaking of the exposed face 8 of the wall which might otherwise result if, lengthwise of the wall, the line of contact 17 were not an absolutely continuous seal so that gaps existed through which or from which would extend vertical streaks or discolorations caused by the products of corrosion.

The upper edge of the upper panel is interlocked with a still higher panel and is exactly like the upper edge of the lower panel. The lower edge of the lower panel is interlocked with a still lower panel and is exactly like the lower edge of the upper panel.

The lowermost panels 10 may be grounded by cables 19 (FIGURE 1) which are welded to these panels and are grounded through metal stakes 20 or other suitable grounding means. With the lowermost panels grounded, the lines of electrical contact 15 effectively establish grounding of the entire wall while themselves being shielded from corrosive agents by the dielectric lines of contact 16 and 17 as described above.

"Upper," "lower," "upwardly," "downwardly," "above," "below," and like terms are used herein with reference to the horizontally disposed siding rather than vertically disposed siding. This is purely a matter of language, but as a matter of substance some of the features described herein do have more importance with respect to horizontally positioned board than with respect to vertically positioned board, as for example the location of the electrically conducting line of contact above the dielectric lines of contact. However such features may continue to be important in vertical paneling, even though their importance may be diminished as compared to their provision in horizontal paneling. Furthermore these features may assume non-functional significance with respect to vertical panels to the extent that there may be substantial inventory advantages in providing a single panel design which is capable of fulfilling all practical requirements of both vertical and horizontal installations or, even if the horizontal and vertical panels differ (as where a board-and-batten effect is desired in the vertical panels), to the extent that there may be cost-saving manufacturing advantages in preserving the identity of the joint structure and coating in both types of panels as in the exemplary wall described above.

The invention is not restricted to the slavish imitation of each and every one of the details described above which have been set forth merely by way of example with the intent of most clearly setting forth the teaching of the invention. Obviously, devices may be provided which change, eliminate, or add certain specific structural details without departing from the invention.

What is claimed is:

1. A wall comprising an array of similar elongated prefinished panels of electrically conductive material in parallel, overlapping relationship, each panel having a dielectric corrosion-resistant protective coating which is applied thereto before the panels are installed in said array, adjacent pairs of panels in said array, each pair including a first panel and a second panel connected along their overlapping zone by an interlocking joint, said interlocking joint including a first part of said joint formed along said overlapping zone of said first panel having a channel having opposed wall surfaces and a second part of said joint formed along said overlapping zone in said second panel, said second part projecting into said channel and engaging both of said opposed wall surfaces thereof, portions of said first and second part providing said engagement between said second part and at least one of said opposed wall surfaces being free of said dielectric coating and providing an electrical connection between each pair of panels along the interlocking joint therebetween, all exterior surfaces of said panels being covered by said dielectric coating, each panel being formed with a dielectric coated portion between its exterior surface and its part of said interlocking joint, said dielectric coated portion of said first panel being in face-to-face adjacency with the dielectric coated portion of said second panel along a zone adjacent to said interlocking joint so that said interlocking joint is hidden from view from the exterior of said wall and so that a barrier is provided to resist entry of corrosion-producing contaminants into said interlock and an electrical ground connected to at least one panel of said array.

2. A wall as set forth in claim 1 wherein said panels extend horizontally and said interlocking joint is located above said face-to-face adjacency.

3. A wall as set forth in claim 2 wherein said channel is located adjacent the upper edge of said panel and is a downwardly open channel.

4. A wall comprising an array of similar elongated, prefinished panels of electrically conductive material in parallel, overlapping relationship, each panel having a dielectric corrosion-resistant protective coating which is applied thereto before the panels are installed in said array, adjacent pairs of panels in said array, each pair including a first panel and a second panel connected along their overlapping zone by an interlocking joint, said interlocking joint including a first part of said joint formed along said overlapping zone of said first panel having a channel having opposed wall surfaces and a second part of said joint formed along said overlapping zone in said second panel, said second part projecting into said channel and engaging both of said opposed wall surfaces thereof, portions of said first and second part providing said engagement between said second part and at least one of said opposed wall surfaces being free of said dielectric coating and providing an electrical connection between each pair of panels along the interlocking joint therebetween, all exterior surfaces of said panels being covered by said dielectric coating, each panel being formed with a dielectric coated portion between its exterior surface and its part of said interlocking joint, said dielectric coated portion of said first panel being in face-to-face adjacency with the dielectric coated portion of said second panel along a zone adjacent to said interlocking joint so that said interlocking joint is hidden from view from the exterior of said wall and so that a barrier is provided to resist entry of corrosion-producing contaminants into said interlock, a chemical primer coating provided on each panel along portions thereof free of dielectric coating, said chemical primer coating providing electrical contact while resisting corrosion along the portions free of said dielectric coating and an electrical ground connected to at least one panel of said array.

5. A panel for use as an external wall covering with similar, overlapping, parallel-arranged panels comprising an elongated sheet metal base, a dielectric coating on said base, said panel being formed along one longitudinal edge with a first part of an interlocking joint providing a channel having opposed wall surfaces and along its opposite longitudinal edge with a second part of an interlocking joint, said second part being shaped and adapted to project into a channel and engage the opposed surfaces of a first part of a similar, parallel, overlapping panel and cooperate therewith to provide an interlocking joint between such panels, said first part being provided with a first portion on at least one of said wall surfaces which is free of dielectric coating, said second part being provided with a second portion free of said dielectric coating, said first portion being located within said channel and shaped to provide electrical contact within said channel with a second portion of a similar, parallel, overlapping panel and provide an electrical connection between such panels along the length of the overlapping portions, the remainder of said panel including all exteriorly exposed surfaces being covered with dielectric coating, said panel between each of said first and second parts and its exteriorly exposed surface constituting dielectric coated means for producing face-to-face adjacency of its exterior dielectric coating with the exterior dielectric coating of a similar, parallel, overlapping panel adjacent to the contacting first and second portions for hiding said interlocking joint from view from the exterior of the panels and for providing a barrier to resist entry of corrosion producing contaminants into the area of such electrical connection when said panel is installed on a wall with similar overlapping and interlocking panels.

6. A panel as set forth in claim 5 wherein said first part of said interlocking joint is formed by a first reverse bend causing said metal base to extend back toward the adjacent edge, and a second reverse bend causing said metal base to extend away from said adjacent edge, the parts of said panel extending from said second bend cooperating with said second bend to form said channel.

7. A panel as set forth in claim 5 wherein a chemical primer coating is provided on said panel along the portions thereof free of dielectric coating, said chemical primer coating providing electrical contact while resisting corrosion along the portions free of said dielectric coating.

8. A panel as set forth in claim 7 wherein said chemical primer coating is provided on substantially all of the surfaces of said sheet metal base including the surfaces thereof under said dielectric coating.

References Cited by the Examiner
UNITED STATES PATENTS

| | | | |
|---|---|---|---|
| 1,502,924 | 7/1924 | Stanley | 174—2 |
| 1,732,779 | 10/1929 | Stough | 174—2 |
| 3,159,943 | 12/1964 | Sugar et al. | 52—309 |

OTHER REFERENCES

Modern Plastics, January 1952, p. 120; Scientific Library call No. TP 986, AIM6.

Wethersfield, Conn., Ordinances, Amended Article XXIII, sec. 2316, subsec. 7L, adopted July 24, 1960, 2 pp.

FRANK L. ABBOTT, *Primary Examiner.*

J. L. RIDGILL, *Assistant Examiner.*